(12) United States Patent
Okazaki

(10) Patent No.: US 8,094,700 B2
(45) Date of Patent: Jan. 10, 2012

(54) TRANSMITTER, TRANSMISSION METHOD, RECEIVER, RECEIVING METHOD, COMMUNICATION DEVICE, AND COMMUNICATION METHOD INCLUDING GENERATING AN INDIVIDUAL SPREAD CODE AND PERFORMING SPREAD SPECTRUM PROCESSING

(75) Inventor: Osamu Okazaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1109 days.

(21) Appl. No.: 11/902,744

(22) Filed: Sep. 25, 2007

(65) Prior Publication Data

US 2008/0084920 A1 Apr. 10, 2008

(30) Foreign Application Priority Data

Sep. 26, 2006 (JP) ................. 2006-260018

(51) Int. Cl.
*H04B 1/00* (2006.01)
(52) U.S. Cl. ........................ 375/146; 375/130
(58) Field of Classification Search .............. 375/146, 375/140, 130
See application file for complete search history.

(56) References Cited

U.S. PATENT DOCUMENTS 6,320,842 B1 * 11/2001 Mochizuki ............... 370/206
2007/0133474 A1 * 6/2007 Farkas et al. ............. 370/335

FOREIGN PATENT DOCUMENTS

| JP | 62-122753 | 8/1987 |
| JP | 10-276170 | 10/1998 |
| JP | 2006246059 A * | 9/2006 |

\* cited by examiner

*Primary Examiner* — David C. Payne
*Assistant Examiner* — Brian J Stevens
(74) *Attorney, Agent, or Firm* — McGinn Intellectual Property Law Group, PLLC

(57) ABSTRACT

A communication device includes a transmitter and a receiver. The transmitter includes a transmission-side code generator and a first spread unit for example. The receiver includes a reception-side code generator and a first inverse spread unit for example. The transmission-side code generator generates a spread code comprised of a spread code scheduled according to a difference of a transmission cycle of an input signal. The first spread unit performs spread spectrum processing on the input signal by the spread code. The reception-side code generator generates a spread code in use for performing inverse spread spectrum processing on a receiving signal. The first inverse spread unit performs inverse spread spectrum processing on the receiving signal by the spread signal generated at the code generator.

10 Claims, 18 Drawing Sheets

Fig. 5

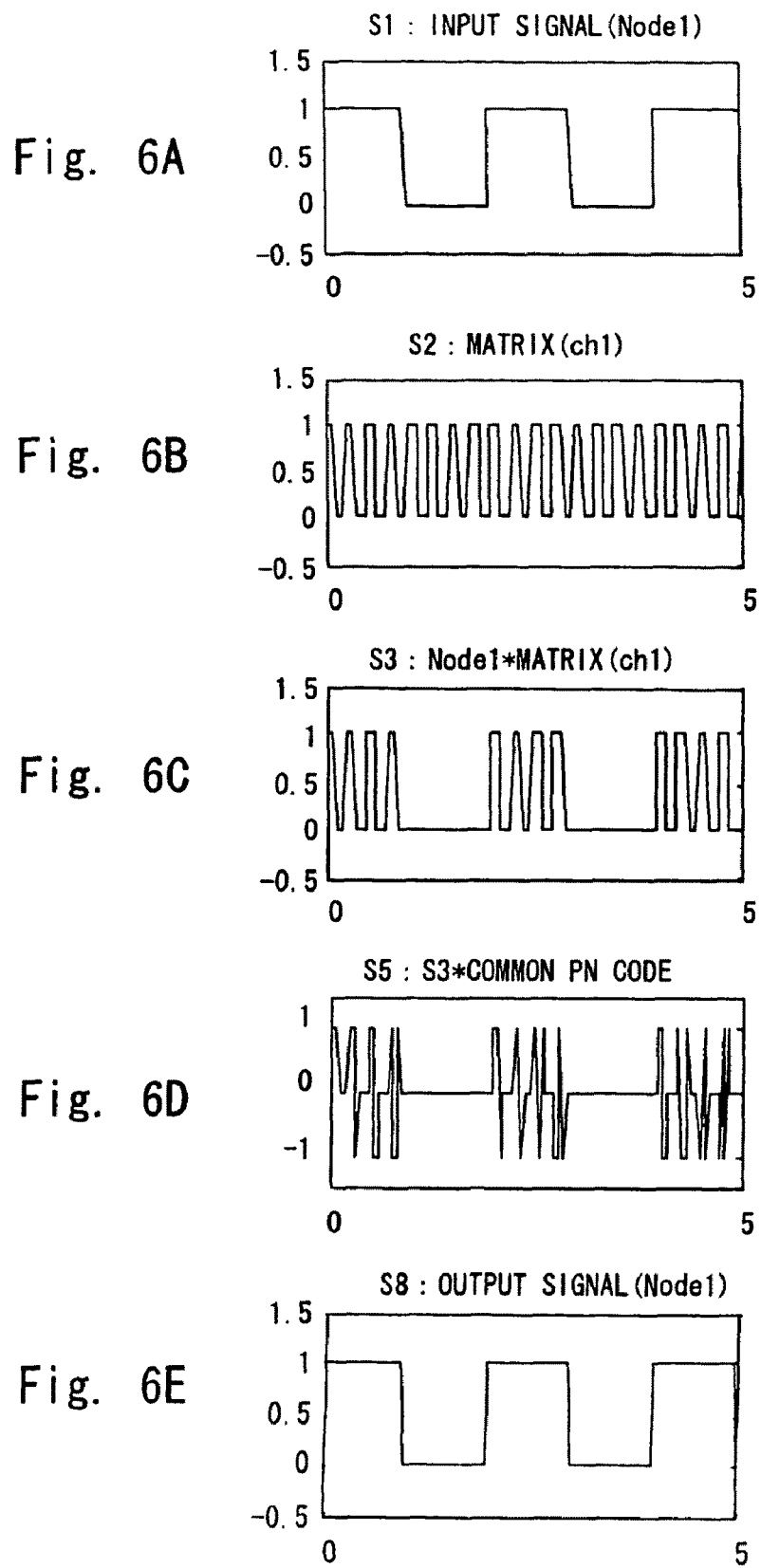

TRANSMISSION PATTERN
OF REFERENCE SIGNAL
("1" FOR EXAMPLE)

TRANSMITTER, TRANSMISSION METHOD, RECEIVER, RECEIVING METHOD, COMMUNICATION DEVICE, AND COMMUNICATION METHOD INCLUDING GENERATING AN INDIVIDUAL SPREAD CODE AND PERFORMING SPREAD SPECTRUM PROCESSING

BACKGROUND OF THE INVENTION

1. Field of the Invention

The present invention relates to a transmitter, a transmission method, a receiver, a receiving method, a communication device, and a communication method which are applicable for a consolidated wiring of simple switching functioning parts such as switches or relays of a car (car) and sensors and so on.

2. Description of Related Art

As car electronics has been developed, an amount of wire harness used in a car has been increasing. This has brought problems such as an increase of car weight, an increase of difficulty in setting lines, and a deterioration in easiness of assembling operation. It also causes following problems. Space required for an ECU (Engine Control Unit) body is increasing because of an increase in a number of input-output lines for the ECU. Easiness of assembling operation is deteriorated because of an increase of power required for connecting the lines. Demands for performance of individual parts are increased because the ECU is mounted in a bad environment portion in order to deal with restrictions caused by the ECU body and an amount of the harness.

For example, there are a lot of switches connected to wirings arranged around a door of a high-quality car and a lot of ECUs are also arranged over separately because of a multi-functional trend of the car such as a door lock, a power window, a door mirror, and so on.

Therefore, the wire harness for the car so enlarged that it is difficult to further develop the car. A burden for a man-hour of soft development and management for arranging microcomputers separately is also greatly increasing.

As explained above, car equipments are getting multi-functional and complicated because they are required to be more comfortable and safer and more environmentally friendly. Accordingly, a number of control devices and electrical devices such as sensors and relays which are mounted on the car is increasing and a number of wirings for connecting these elements is also increasing. An increase in the number of the wirings causes an increase in the car weight and man-hour for setting. Therefore, various multiple communication methods have been suggested for decreasing a number of the wirings from past.

For example, a technique that superimposes a signal on a power line by performing spread spectrum in order to decrease a number of wirings and man-hour for setting is disclosed in Japanese Unexamined Utility Model Publication No. 62-122753 (hereinafter referred to as Takesaki et al.). A consolidated wiring device for car disclosed in Takesaki et al. includes means for performing spread spectrum processing on a transmission data by a PN (Pseudo Noise) code, means for superimposing a spread signal on the power line, means for performing inverse spread processing on the spread signal, and means for demodulating an inverse spread signal. More specifically, the consolidated wiring device for car checks status of each switch by a control circuit, edits a control data transferred to corresponding each terminal control device, and outputs the predetermined data. This data is converted to serial data by a SP (Serial-Parallel) converter. Further spread spectrum is performed on this data in a spread spectrum circuit. Tolerance against noise is strengthened by PN spread and malfunction is suppressed. The number of wirings and connectors is decreased by superimposing signals on the power line.

Technique for providing an intra-vehicle communication system having strong noise tolerance and simple wiring construction is disclosed in Japanese Unexamined Patent Application Publication No. 10-276170 (hereinafter referred to as Mori). The intra-vehicle communication system shown in Mori establishes communication between devices, which are mounted on vehicles such as busses, by performing spread spectrum processing. The intra-vehicle communication system includes one coaxial cable provided in the vehicle and a connector electrically connecting the consolidated cable with a plurality of devices that are provided corresponding to each of the plurality of devices. Only the dedicated consolidated cable is used for communication between devices thereby simplifying arrangement of wirings. Effect of noise is also reduced by performing the spread spectrum.

In techniques disclosed in Takesaki et al and Mori, a number of wirings is decreased by multiplexing communication between a plurality of control devices (ECUs) as shown in FIG. 11A. On the other hand, it is supposed that wiring for information transmission between cheaper switches or relays and control devices is still carried out one by one.

However wiring weight for this information transmission actually occupies large portion of a total wiring weight. In addition, a number of lines are remarkably increasing because the number of car equipments are increasing as mentioned above, so it is demanded to decrease a number of wirings. That is, it is required to multiplex communications between sensors or switches and the ECU as shown in FIG. 11B. When it is tried to apply techniques shown in Takesaki et al. and Mori to this case, problems are raised such as an insufficient of the number of PN spread code or of a communication speed.

The spread spectrum communication has a synchronous type and a non-synchronous type. There is a limit on a number of PN codes used in the non-synchronizing type. Therefore, the synchronizing type that uses an orthogonal code is preferable for connection having a large number of nodes.

Generally, communication speed of the spread spectrum communication is not a communication speed of data itself but a communication speed of an orthogonal matrix code gained by multiplying the communication speed of the data itself.

Length of the orthogonal matrix code becomes longer according to a number of connecting element. So, it is not avoidable to increase a whole communication speed in order to increase a number of connecting elements while holding a constant communication speed of data. On the other hand, there is an upper limit on a transmission speed of a signal in wire harness. Therefore, there is an upper limit on communication speed capable of holding synchronization in order to achieve a practical communication distance.

Therefore, communication speed for each node is a value gained by dividing upper limit value by a spread speed and the communication speed can be greatly slowed compared with a communication speed at one by one communication. Because there is a trade-off relationship between an increase in communication speed and an increase in a number of connections, it is difficult to achieve both of them.

By the way, a related communication device shown in FIG. 12 is known which superimposes a plurality of input signals and then transmits the superimposed signal. As shown in FIG. 12, the communication device performs PSK modulation at each PSK modulator $501a$ to $501c$ on input signals $S11_1$ to $S11_3$ at a plurality of channels respectively, performs PN spread at each PN spread unit $502a$ to $502c$, and superimposes and transmits the signals. At receiving side, a SS invert spread unit 503 performs SS invert spread, demodulates at a PSK demodulator 504, and gains an output signal.

Signal waveforms in this case are shown in FIGS. 13A to 13F and 14A to 14E. FIG. 13A shows an example of input signals $S11_1$ to $S11_3$. FIG. 13B shows a signal S12 after PSK modulation is performed. FIG. 13E shows an enlarged view of FIG. 13B. FIG. 13C shows a signal S13 after PN spread processing is performed. FIG. 13F shows an enlarged view of FIG. 13C. FIG. 13D shows a signal waveform showing an example of PN code used in PN spread processing. PN codes that are specific to each channel are used.

FIG. 14A shows a signal waveform of superimposed signal S14 gained by superimposing spread signals from PN spread units $502a$ to $502c$ after PN spread processing is performed. FIG. 14D shows an enlarged view of FIG. 14A. FIG. 14B shows a signal S15 after SS invert spread. FIG. 14E is an enlarged view of FIG. 14B. FIG. 14C shows a signal waveform of an output signal S16 after PSK demodulation is performed.

Although it is possible to superimpose and transmit input signals in these methods, the maximum amplitude of signal shown in FIG. 14D is stacked according to a number of channels when signals after PSK modulation is performed are superimposed without no treatment. If an amplitude of 1 channel is −1 to 1 (v), an amplitude of a superimposed portion is set to −30 to 30 (V) and it is impractical.

Note that many techniques including a power line communication such as above-mentioned Takesaki et al. and Mori and so on adopt CSMA (Carrier Sense Multiple Access) system to avoid the amplitude of signals to be superimposed. The CSMA is one of communication system used for LAN (Local Area Network). In this CSMA, a node (device) monitors a communication status of a cable (Carrier Sense), and starts to transmit when the communication status of the cable is less busy.

If a plurality of nodes (devices) start to transmit data at the same time, the data may crash with each other and may be collision detection. In this case, the plurality of nodes stop transmitting data and start transmitting data after predetermined period of time. According to this method, it is possible to communicate mutually (Multiple Access) with sharing one cable with the plurality of nodes. However it is difficult to apply the CSMA type multiple communication which is not capable of successive communication to a communication that requires a successive data transmission such as above mentioned wire harness and so on in the car.

SUMMARY

In one embodiment, a transmitter performs spread spectrum communication using a spread code. The transmitter includes a transmission-side individual code generator generating an individual spread code comprised of a spread code scheduled according to a difference of a transmission cycle of an input signal; and a first spread unit performing spread spectrum processing on the input signal by the individual spread code.

In another embodiment, a receiver performs spread spectrum communication using a spread code. The receiver includes a reception-side individual code generator generating an individual spread code for performing inverse spread spectrum processing on a receiving signal gained by performing spread spectrum processing on an input signal by the individual spread code comprised of a spread code scheduled according to a difference of a transmission cycle of the input signal; and a first inverse spread unit performing inverse spread spectrum processing on the receiving signal by the individual spread code generated at the reception-side individual code generator.

In still another embodiment, a communication device performs spread spectrum communication using a spread code. The communication device includes a transmitter performing spread spectrum processing on an input signal by an individual spread code comprised of a spread code scheduled according to a difference of transmission cycle of the input signal and transmitting the spread signal; and a receiver generating an output signal by performing inverse spread spectrum processing on a receiving signal from the transmitter by the individual spread code.

In still another embodiment, a transmission method is for a transmitter performing spread spectrum processing using a spread code. The transmission method includes generating an individual spread code comprised of a spread code scheduled according to a difference of transmission cycle of an input signal; and performing spread spectrum processing on the input signal by the individual spread code to transmit the spread signal.

In still another embodiment, a receiving method is for a receiver performing spread spectrum communication using a spread code. The receiving method includes generating an individual spread code for performing inverse spread spectrum processing on a receiving signal gained by performing spread spectrum processing on an input signal by the individual spread code comprised of a spread code scheduled according to a difference of a transmission cycle of the input signal; and performing inverse spread spectrum processing on the receiving signal by the individual spread code.

In still another embodiment, a communication method is for a communication device including a transmitter and a receiver and performs spread spectrum communication using a spread code. The communication method includes performing spread spectrum processing on an input signal by an individual code comprised of a spread code scheduled according to a difference of transmission cycle of the input signal to transmit the spread signal by the transmitter; receiving a signal from the transmitter by the receiver; and generating an output signal by performing inverse spread spectrum processing on the received signal by the individual spread code.

According to this invention, spread spectrum communication is performed using a spread code that is scheduled according to a difference of a transmission cycle. Therefore, it is possible to superimpose a plurality of input signals, transmit the input signals in one communication path, receive it, or transmit/receive it. According to this invention, it is possible to decrease a number of wirings, a total weight of a communication device, and a man-hour for setting in the communication device for car for example.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a view showing a spread matrix corresponding to channels ch1 to ch12;

FIGS. 6A to 6E are views showing signal waveforms S1, S2, S3, S5, and S8 corresponding to channel ch1, the signal waveforms being waveforms of signal output from each block of a communication device according to a first embodiment of this invention;

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

In this embodiment, signals that flow wiring system (wire harness), which plays a role of transferring information or energy inside a car, is multiplexed. This makes it possible to consolidate the harness, decrease a number of wirings, and lighten a total weight and to realize a continuous communication between a plurality of nodes from ten to several ten channels for example.

Therefore, a spread code (hereinafter also referred to as individual spread code) is used in this embodiment. Note that the spread code is scheduled by combining a long or short length of a transmission cycle of an input signal that is to be a transmission data. Each of the spread signals which are gained by spreading the input signal by the individual spread code has a different peak position. The amplitude is not multiplexed because the peak positions are shifted mutually compared with the above-mentioned related art. Therefore, it becomes possible to multiplex signals from the plurality of nodes of several ten channels, consolidate individual wire harnesses which are provided individually in the related art, and provide a communication device having a larger number of connections with a faster communication speed.

Note that the communication device according to this invention is explained as the device used in automobile (car), but the present invention is not limited to this. This invention is applicable to a communication device where a signal from a plurality of input devices are transmitted to a receiver via one communication path, or a signal from a transmitter is transferred to a plurality of receivers via one communication path. Especially, this invention is suitable for a communication between the simple switching functioning parts such as switches and relays.

Figure 1:
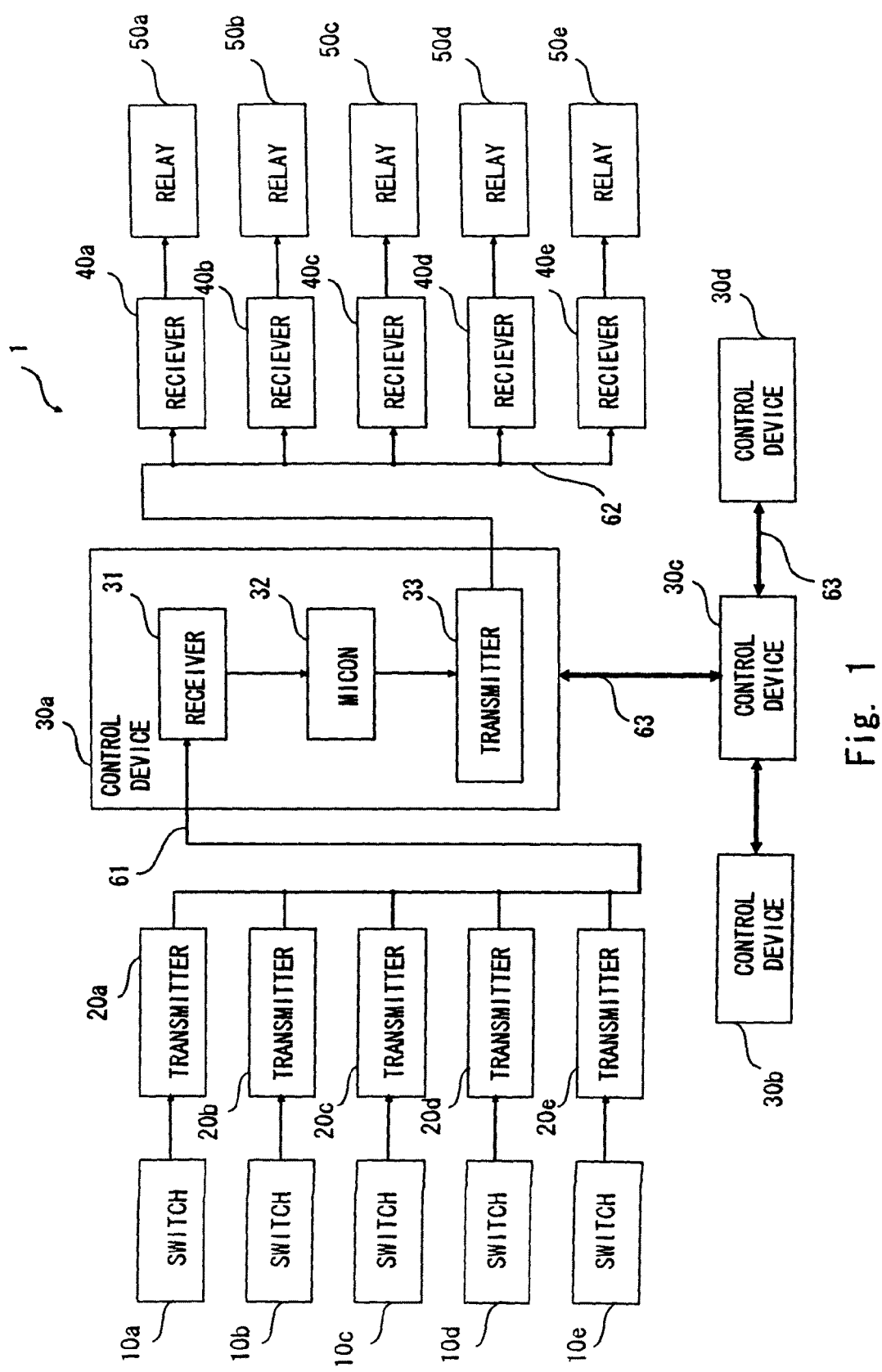
FIG. 1 is a block diagram of a communication device for car according to a first embodiment of this invention.

FIG. 1 shows a block diagram of a communication device for car according to the first embodiment of this invention. As shown in FIG. 1, a communication device 1 comprises a plurality of switches 10a to 10c, a plurality of sensors 10d and 10e, a plurality of transmitters 20a to 20e, a plurality of control devices 30a to 30d, a plurality of receivers 40a to 40e, a plurality of relays 50a to 50e, consolidated lines 61 and 62, and a communication line 63 between control devices.

Figure 2:
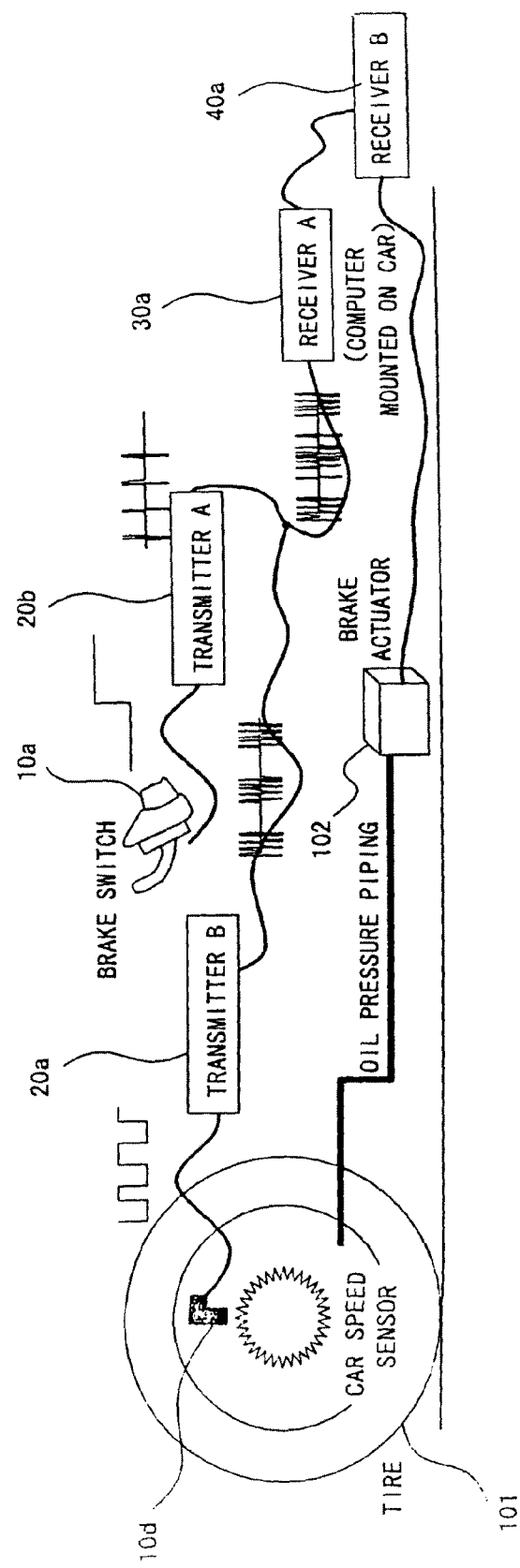
FIG. 2 is a schematic view showing a communication device for car.

A number of switches and sensors are not limited to the number shown in FIG. 1. Three Switches 10a to 10c and two sensors 10d and 10e are shown in FIG. 1, but ten or more switches or sensors would be provided actually. As shown in FIG. 2, the switch 10a is a brake switch as an example and the sensor 10d is a car speed sensor attached to a tire 101 as an example.

The transmitters 20a to 20e are provided according to each switch or sensor. The transmitters 20a to 20e perform spread spectrum processing on signals which are input to the transmitters 20a to 20e (transmitter A or transmitter B and soon) from switches 10a to 10c or sensors 10d or 10e. Signals output from the transmitters 20a to 20e are superimposed on the consolidated line 61.

The receiver 31 inside the control device 30a performs inverse spread spectrum (despread spectrum) processing) on the superimposed signal by desired codes. The superimposed signal is decoded by a receiver 31 (receiver A). The decoded data is processed by a microcomputer (hereinafter referred to as micon) 32.

Control signals (transmission signals) are transferred from the micon 32 to the transmitter 33 inside the control device 30a. The control signals are used for controlling each relay 50a to 50e. The transmission signal is transferred to each receiver 40a to 40e (receiver B) via the consolidated line 62 after being processed through spread spectrum processing according to its destination address. Each receiver 40a to 40e decodes accepted signals. Decoded signals output from each receiver 40a to 40e are transferred to each relay 50a to 50e.

The relays 50a to 50e are a pump, a fuel jet device of engine, or actuator or others for example.

In this way, the micon 32 receives signal that shows a depressing degree of an accelerator via the transmitters 20a to 20e, calculates an amount of gasoline to be used based on these accepted signals, and transmits control signals to a fuel pump and an exhaust device via the receivers 40a to 40e based on the calculation result.

The micon 32 receives a signal from the brake switch 10a via the transmitter 20a and controls a brake actuator 102 via the receiver 40a based on the control signal generated by the signal from the brake switch 10a. The brake actuator 102 controls oil pressure based on the control signal and controls an amount of braking.

A part of data is transferred to control devices 30b or 30c via the communication line 63 between control devices which has been adopted from past.

Figure 3A:
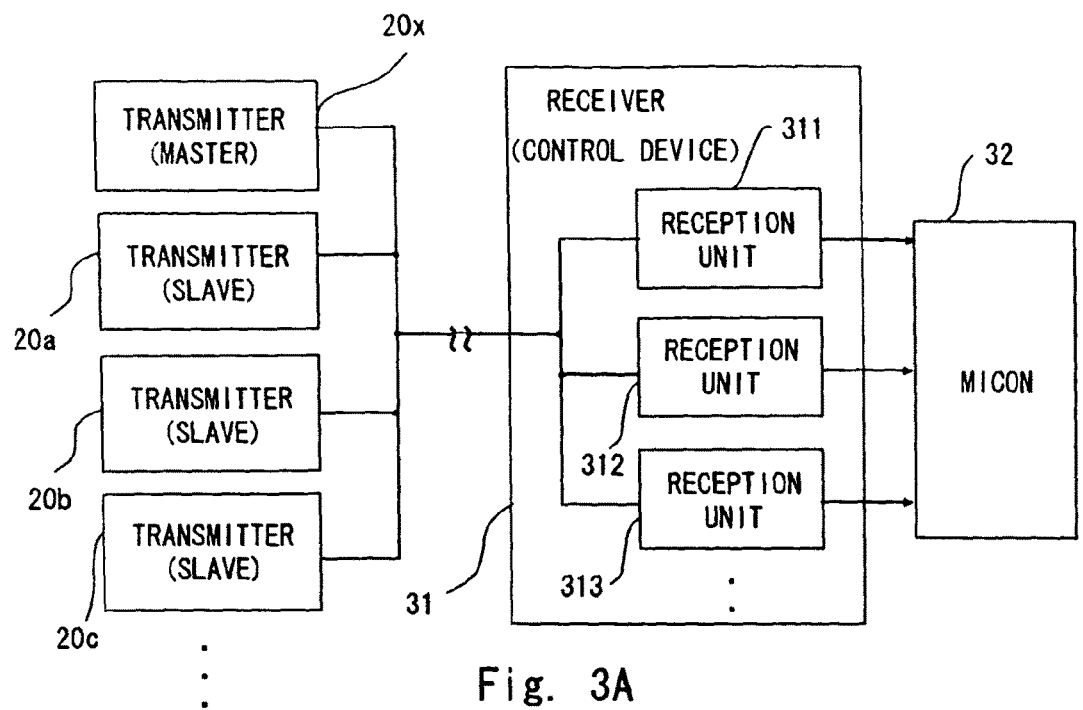
FIGS. 3A and 3B are views showing an exemplary construction of a communication device according to a first embodiment of this invention.
Figure 3B:
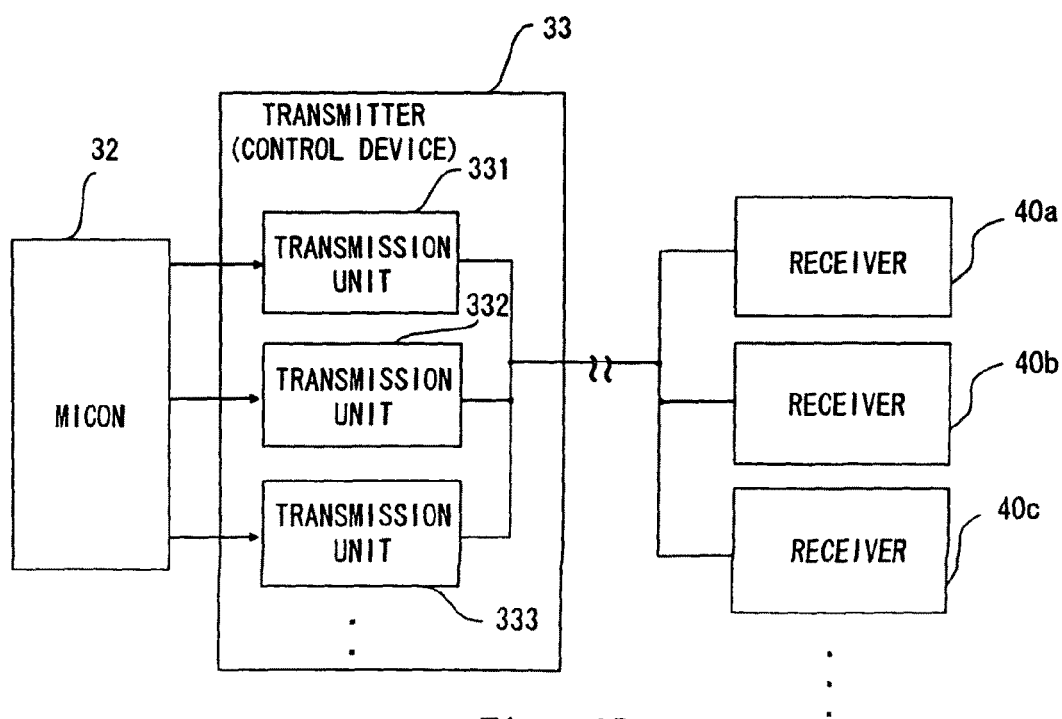

FIGS. 3A and 3B show an example of a communication device of this embodiment. FIG. 3A shows transmitters 20a to 20c and the receiver 31 in addition to the micon 32. FIG. 3B shows the transmitter 33 and receivers 40a to 40c in addition to the micon 32.

The transmitters 20a to 20c receive input signals from the switches 10a to 10c. The receiver 31 is a receiver provided inside the control device 30a which receives a superimposed signal that is generated by superimposing these transmission signals from the transmitters 20x. The receiver 31 is connected to the micon 32.

The transmitter 33 receives signals from the micon 32 and outputs a superimposed signal generated by superimposing the signals from the micon 32. Then the superimposed signal is transmitted to each receiver 40a to 40c. The transmitter 33 is inside the control device 30a. The receivers 40a to 40c connected to the relays 50a to 50c are shown as an example.

A construction of the communication device is just one example and not limited to that. For example, the communication device may comprise all of the transmitters 20a to 20c, the receiver 31, the transmitter 33, and receivers 40a to 40c. The communication device may only comprise the receiver 31 and the transmitter 33. It is also possible to connect the receiver 31 and the transmitter 33 directly without connecting the micon 32 therebetween.

As shown in FIG. 3A, at transmission side, there are provided a master transmitter 20x that generates a signal for synchronization tracking and slave transmitters 20a to 20c that performs synchronization tracking by a signal generated by the master transmitter 20x. In this embodiment, the master transmitter 20x is provided for the sake of simplicity, but each transmitter and receiver may have a master function and may operate as a master in case that a reference signal (mentioned below) is not detected.

A communication between the master transmitter 20x or the three slave transmitters 20a to 20c and the receiver 31 inside the control device 30a are explained below. However, as mentioned below, it is possible to provide ten or more pieces of the slave transmitter (hereinafter simply referred to as transmitter). The transmitters 20a to 20c perform spread spectrum processing on an input signal by the above mentioned individual spread code (hereinafter mentioned as matrix (chn)) and transmit the spread signal.

This matrix (chn) is composed of a spread code scheduled by combining a long or short length of a transmission cycle of the input signal that is to be a transmission data. For example, in the above-described example, a transmission cycle of a signal from the car speed sensor is faster than that of the brake sensor. The matrix (chn) is composed by superimposing a second input signal (channel ch2) between first input signals (channel ch1) according to a difference in transmission cycle. Note that the first input signal has a faster transmission cycle (sampling cycle) than that of the second input signal.

That is, the matrix (chn) is prepared beforehand according to its transmission cycle for the first and second input signals, and the first and second spread signals on which spectrum spread processing is performed using the first and second input signals are configured to have a different peak time with each other.

In this embodiment, each signal source (each switch or sensor) is corresponded to n channel and the transmitter (hereinafter referred to as transmitter 20a except when it is required to distinguish each transmitters 20a to 20c) where signals are input from each signal source has a matrix generator (not shown) that generates the matrix (chn) corresponding to the channel chn allocated to itself.

The transmitter performs spread spectrum processing on the input signal by the matrix (chn) that corresponds to its channel generated at its matrix generator. Each spread signal from each transmitter 20a is superimposed at a communication path and then received by the receiver 31.

The transmitter 20a further includes a matrix (individual spread code) in order to spread the reference signal for synchronization. In this case, the channel ch0 is allocated to the reference signal and the individual spread code scheduled for synchronization is set to a matrix (ch0). Each channel ch1 to ch3 is allocated to each transmitter 20a to 20c. Each transmitter 20a to 20c is configured to be capable of generating the matrix (ch0) of the channel ch0 for decoding the reference signal and two channels of matrices ch1 to ch3 allocated to itself.

At receiving side, inverse spread processing is performed by the same matrix (chn), and all of the matrices (chn) of each transmitter 20a are prepared. That is, the receiver 31 is configured to be capable of performing inverse spread processing by the channel ch0 and a matrices corresponding to channels ch1 to ch3.

This receiver 31 has receiving units 311 to 313. Each receiving unit 311 to 313 has a matrix generator for generating matrices (ch1) to (ch3). Each receiving unit 311 to 313 generates an output signal by performing inverse spread spectrum processing on the superimposed signal, which is generated by superimposing the spread signals output from each transmitter 20a to 20c, by corresponding matrices (ch1) to (ch3).

As shown in FIG. 3B, the transmitter 33 has transmission units 331 to 333 which transmit signals corresponding to the channels ch1 to ch3. The transmitter 33 receives signals from the micon 32. As well as the above explanation, spreading by the channel CHO for gaining the reference signal and the matrix corresponding to the channels ch1 to ch3 (chn) for transmitting each signal is configured to be performable.

Therefore, each transmitter 331 to 333 has a synchronization detector to decode the reference signal and an individual matrix generator to generate each matrix (ch1) to (ch3) respectively and outputs a superimposed signal after performing spread spectrum processing on an input signal input from the micon 32 using the matrices (ch1) to (ch3) generated at the individual code generator.

The receivers 40a to 40c each have an individual matrix generator for generating a matrix (chn) of a channel corresponding to a channel of decode object. The receivers 40a to 40c each receive the superimposed signal output from the transmitter 33, perform inverse spread spectrum processing on a receiving signal by the matrix (chn) of itself, and gain an output signal of a corresponding channel.

Figure 4:
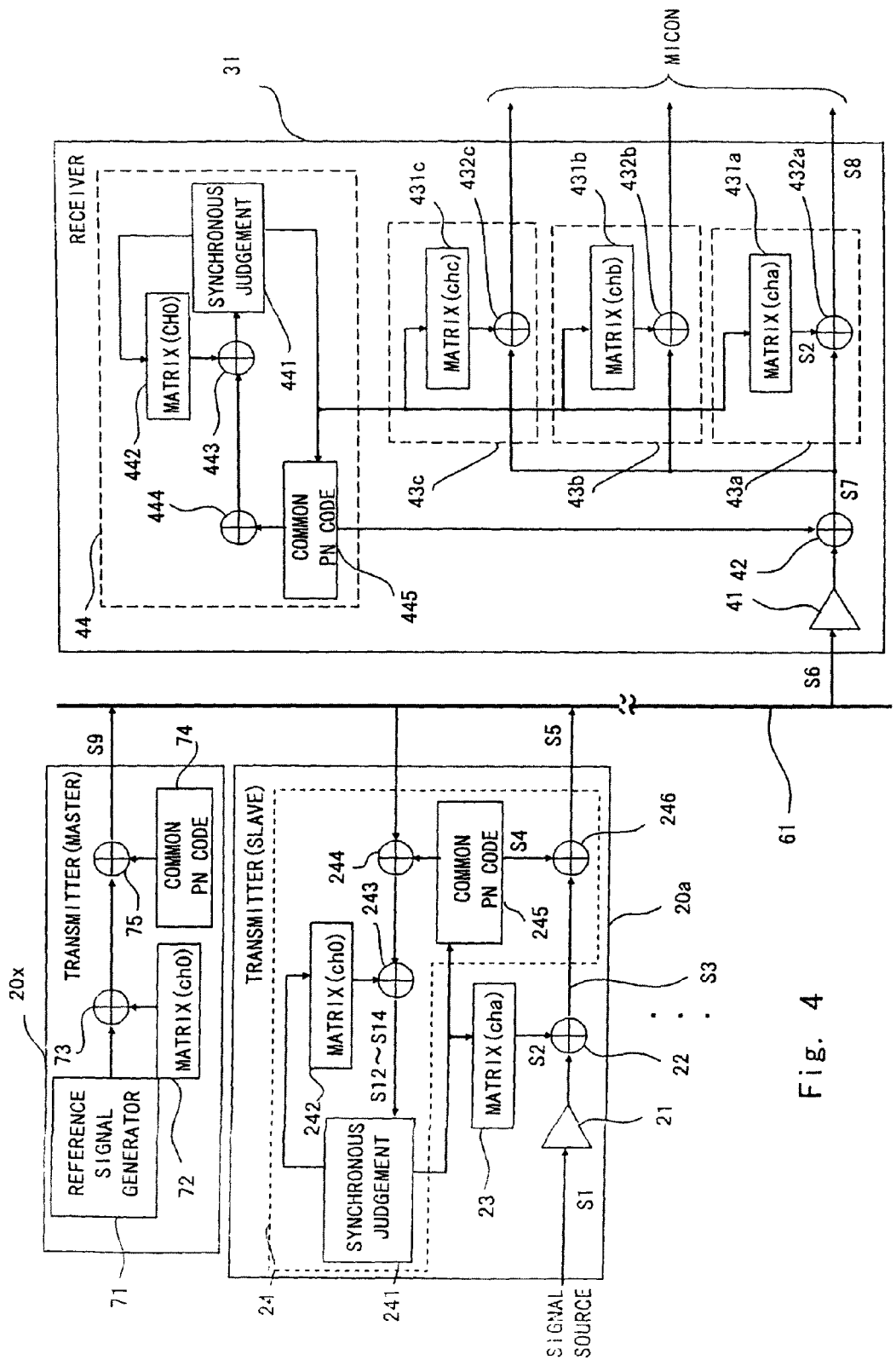
FIG. 4 is a schematic detailed block diagram of a communication device of FIG. 3A according to a first embodiment of this invention.

The communication device according to this embodiment is further explained in detail. The communication device shown in FIG. 3A is explained as an example hereinafter, but it is possible to configure the communication device shown in FIG. 3B as well as the communication device shown in FIG. 3A. FIG. 4 is a schematic detailed block diagram of the communication device of FIG. 3A according to this embodiment. The transmitter 20a includes a buffer 21, a first spread unit 22, a matrix generator 23, and a synchronization detector 24.

The buffer 21 receives a signal S1 from a signal source such as a switch and so on. The matrix generator 23 generates the individual spread code corresponding to the allocated channel. The first spread unit 22 outputs a spread signal S3 after performing spread spectrum processing on the input signal by a matrix (cha) S2 generated by the matrix generator 23.

The synchronization detector 24 includes a synchronization determination unit 241, a ch0 matrix generator 242, spread units 243, 244, and 246, and a common PN code generator 245. The common PN code generator 245 generates a PN code S4 common among all channels including master transmitter 20x and other transmitters (20c, 20a to 20e). Hereinafter this PN code is referred to as common PN code. The second spectrum spread unit 246 performs double spread processing on the spread signal spread by the first spectrum spread unit 22 by using the common PN code and outputs the spread signal S5. In this embodiment, by superimposing the common PN code on all channels, synchronization is performed and signal having a strong noise tolerance is generated.

The ch0 matrix generator 242 generates a matrix (ch0) corresponding to the channel ch0 for the reference signal. As explained above, the channel ch0 is a channel for transmitting the reference signal and the matrix (ch0) is a spread matrix for scheduling this reference signal.

The spread unit 244 performs inverse spread processing on the consolidated signal (superimposed signal) output to the consolidated line 61 by the common PN code. The spread unit 243 generates the reference signal by performing inverse spread processing on the signal gained through inverse spread processing using the matrix (ch0) by the spread unit 243. The synchronization determination unit 241 detects synchronization from the reference signal generated through the inverse spread processing by the spread unit 243 and informs the timing of the reference signal to the matrix generator 23 and the common PN code generator 245.

The matrix generator 23 and the common PN code generator 245 outputs the spread code at this timing and synchronization is captured by making the spread unit 22, 23, 243, and 244 perform spread or inverse spread processing. Note that synchronization detection is realized using the reference signal in addition to the common PN code, but it is possible to realize the synchronization detection by using only the common PN code.

The master transmitter 20x includes a reference signal generator 71, a ch0 matrix generator 72, a first spread unit 73, a second spread unit 75, and a common PN code generator 74. The reference signal generator 71 generates a constant value such as 1. The master transmitter 20x performs spread spectrum processing on the reference signal by using a matrix (ch0) of the channel ch0 allocated for synchronization capturing and outputs a synchronization signal after superimposing the spread signal by the common PN code. The slave transmitter 20a and receiver 31 capture synchronization using this synchronization signal.

As explained above, one channel (ch0) is allocated to a synchronization detection channel and the master transmitter 20x broadcasts a synchronization detection channel. Each transmitter and receiver can capture synchronization by starting the transmission after capturing the timing at the synchronization detection channel.

The receiver 31 includes a buffer 41 for receiving a superimposed signal S6, a second inverse spread unit 42, an inverse spread unit of each channel 43a to 43c having a first spread units 432a to 432c, and a synchronization detector 44. The inverse spread unit 42 performs inverse PN spread processing on the superimposed signal S6 by the common PN code and makes these inverse PN spread signal S7 input to each inverse spread unit of each channel 43a to 43c.

The inverse spread units of each channel 43a to 43c perform inverse spread processing on signals from transmitters corresponding to each channel. So the inverse spread units 43a to 43c generating the matrix (chn) corresponding to each channel include a matrix generator 431a to 431c corresponding to each channel chn respectively, and a first inverse spread unit 432a to 432c that generate an output signal after performing inverse spread processing using the matrix (chn) respectively.

The synchronization detector 44 is configured in a same way as that of the synchronization detector 24 of the transmitter 20a. The synchronization detector 44 includes a synchronization determination unit 441, a matrix generator 442 of channel ch0 allocated for synchronization capturing, and inverse spread units 443 and 445, and a common PN code generator 445. The synchronization determination unit 441 captures synchronization based on an inverse spread processing result of the common PN code and the matrix (ch0), and controls the code generation timing of each of the common PN code generators 445 and each matrix generator 431a to 431c.

It is noted that the receiver 31 is taken as an example but the transmitter 33 includes a matrix generator for generating matrices of the plurality of channels to be transmitted and its spread unit, as the receiver 31 does. It is possible that receivers 40a to 40e only include a matrix generator of a corresponding channel in addition to the matrix (ch0) and the PN code.

The output signals from each channel which are generated at the inverse spread units of each channel 43a to 43c are transferred to the micon 32. The micon 32 executes a predetermined process such as calculating an amount of gasoline or a speed based on the output value from each sensor and starting to operate ABS (Antilock Brake system) based on input values of the car speed sensor and the brake sensor.

Next, the matrix (chn) according to this embodiment is explained in detail. A typical car system is not required to set a same sampling cycle with all sensors or switches. Therefore, it is possible to decrease a number of signal combined to a slot having the shortest cycle by setting a slower sampling signal into a space between signals requiring the fastest sampling in an alternate way.

Figure 5:
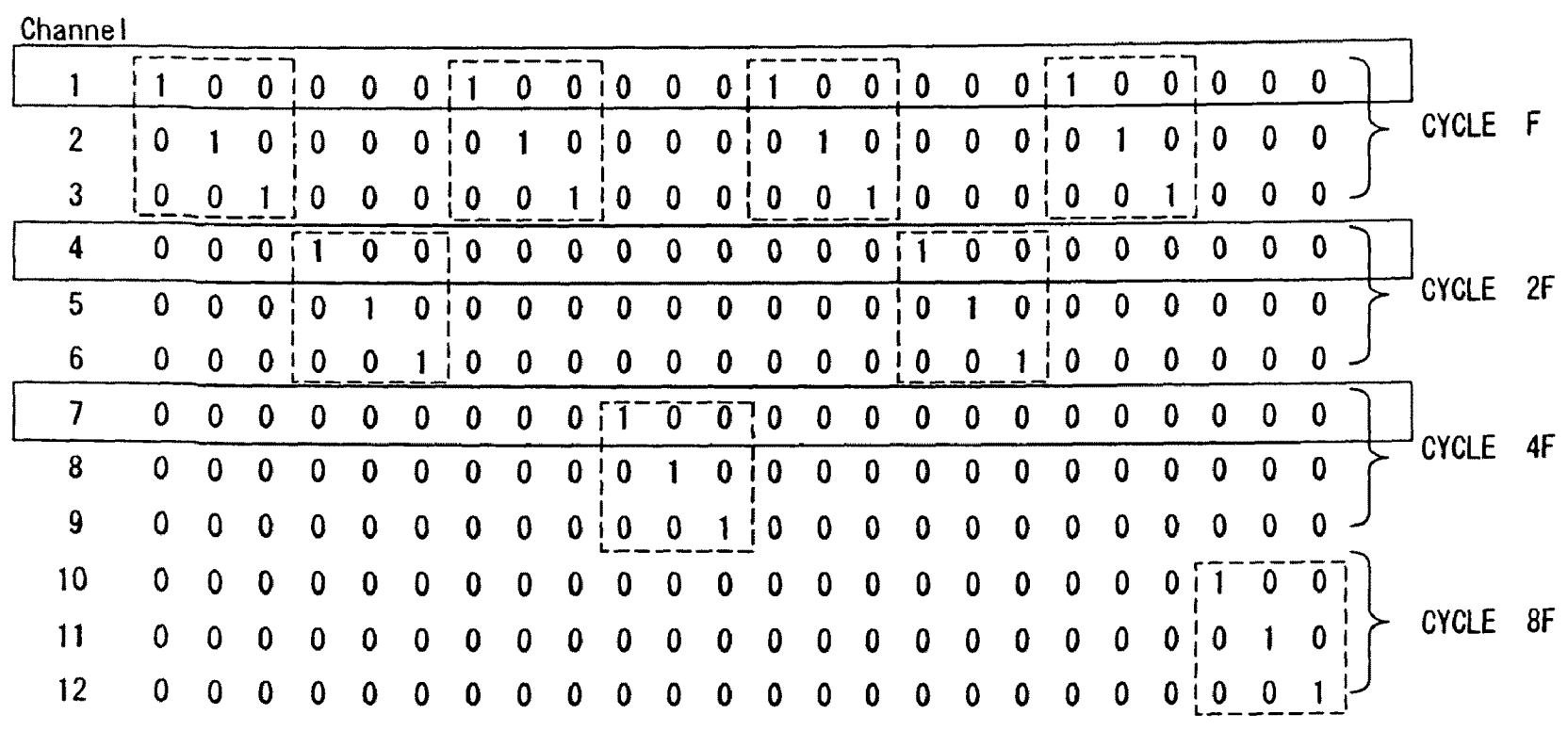

FIG. 5 shows a spread matrix corresponding to the channels ch1 to ch12. Taking FIG. 5 as an example, scheduling is set out as below. Channels for transmitting signal with the fastest sampling speed are allocated to channels ch1 to ch3. Channels for transmitting signal with the second fastest sampling speed are allocated to channels ch4 to ch6. Same explanation can be applied to other channels. In this embodiment, each three channels of all twelve channels are allocated to four types of transmission cycles F to 4F.

Channels ch1 to ch3 can transmit a signal at the timing of cycle F having one cycle of six codes. These channels ch1 to ch3 have same cycle, but have different timing for signal transmission. Channels ch4 to ch6 can transmit signal at the timing of cycle 2F having one cycle of twelve codes. Channels ch7 to ch9 are configured to be able to transmit signal at the timing of cycle 4F of twenty four codes, and Channels ch10 to ch12 are configured to be able to transmit signal at the timing of cycle 8F of forty eight codes. This makes it possible to maintain large number of connections with a ¼ communication speed compared with a case where all inputs are included in the shortest cycle.

An operation of the communication device according to this embodiment is explained below. FIGS. 6A to 10D show waveforms of a signal output from each block of the communication device according to this embodiment. FIGS. 6A to 8E show a signal waveform of the slave transmitter allocated to each channel ch1, ch4, and ch7. That is, Nodes 1, 2, and 3 are allocated to the channels ch1, ch4, and ch7 respectively as shown in FIG. 5 for example. The Input signals (Node 1) to (node 3) (S1) which are respectively shown in FIGS. 6A, 7A and 8A have transmission cycles slower in this order. For example, the input signal Node 1 of the fastest transmission cycle is a signal from the car speed sensor and the input signal Node 3 of a slower transmission cycle is a signal from the brake switch.

This input signal S1 is input to the first spread unit 22 via the buffer 21. The matrix (chn) corresponding to each channel is also input to the first spread unit 22. For example, the channel ch1 corresponding to the input signal (Node 1) generates a matrix (ch1) (Signal S2) of the fastest cycle. Each transmitter 20a can capture timing by the reference signal mentioned above.

Figure 7A:
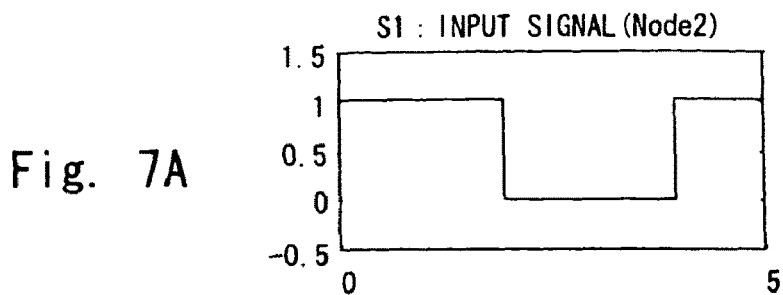
FIGS. 7A to 7E are views showing signal waveforms S1, S2, S3, S5, and S8 corresponding to channel ch2, the signal waveforms being waveforms of signal output from each block of a communication device according to a first embodiment of this invention.
Figure 7B:
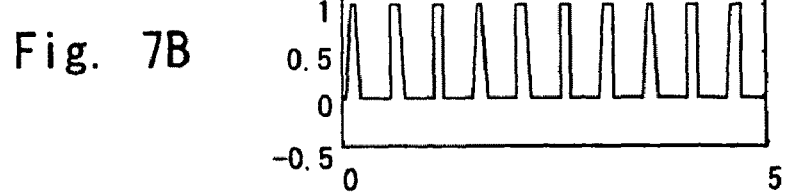
Figure 7C:
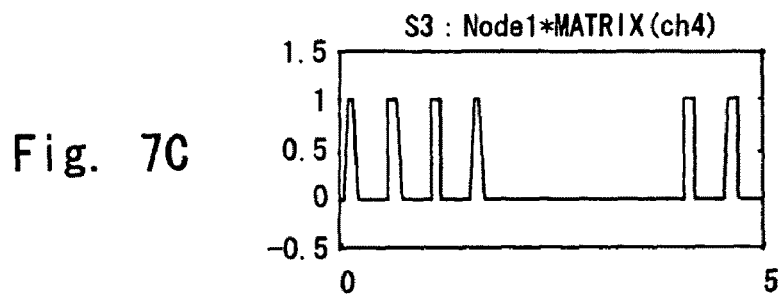
Figure 7D:
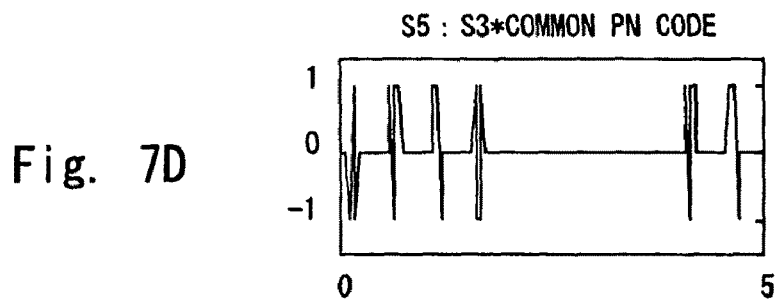
Figure 8A:
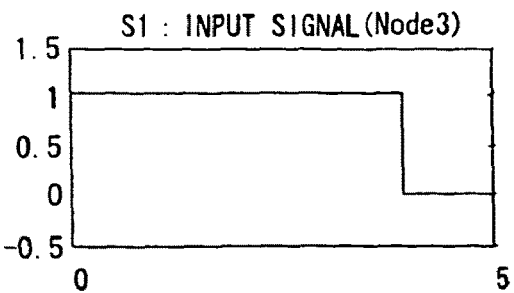
FIGS. 8A to 8E are views showing signal waveforms S1, S2, S3, S5, and S8 corresponding to channel ch3, the signal waveforms being waveforms of signal output from each block of a communication device according to a first embodiment of this invention.
Figure 8B:
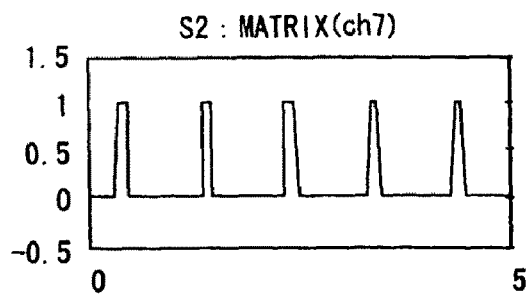
Figure 8C:
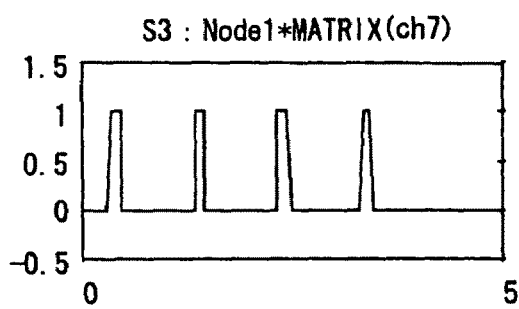
Figure 8D:
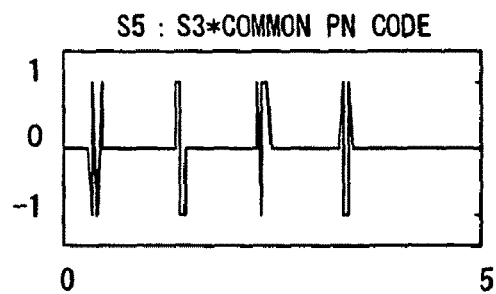
Figure 9A:
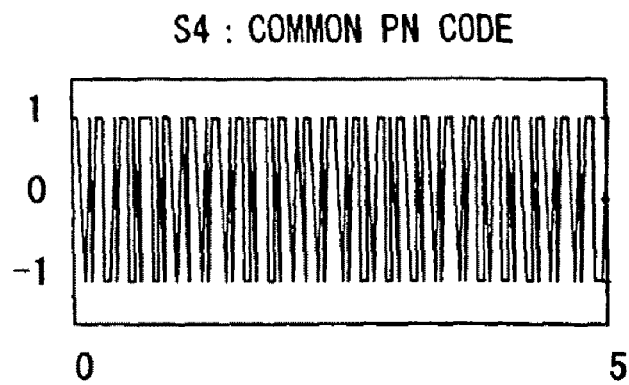
FIG. 9A is a view showing a signal waveform in a communication device according to a first embodiment of this invention and shows a signal waveform of common PN code.
Figure 9B:
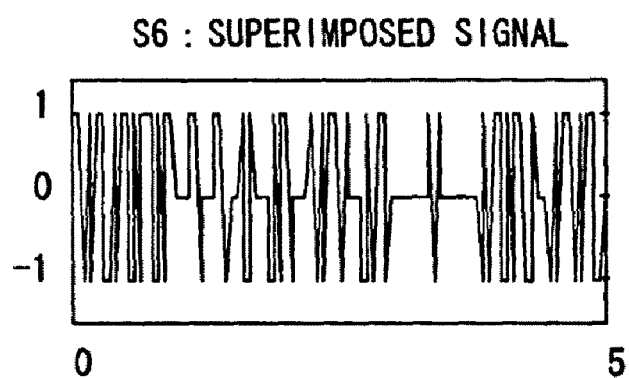
FIG. 9B is a view showing a signal waveform in a communication device according to a first embodiment of this invention and shows a signal waveform of superimposed code.

With reference to FIGS. 6C, 7C, and 8C, the first spread unit 22 outputs a first spread signal S3 after performing spread by a matrix S2 (see FIGS. 6B, 7B, and 8B). Then the first spread unit 22 inputs this spread signal S3 to the second spread unit 246. The common PN code S4 shown in FIG. 9A is also input to the second spread unit 246. The second spread unit 246 outputs a second spread signal S5 gained by spreading the first spread signal S3 by the common PN code S4 (see FIGS. 6D, 7D and 8D). Each transmitter 20a outputs the second spread signal S5. These second spread signals S5 are superimposed on the consolidated line 61 and received by the receiver 31 as a superimposed signal S6 as shown in FIG. 9B.

Figure 9C:
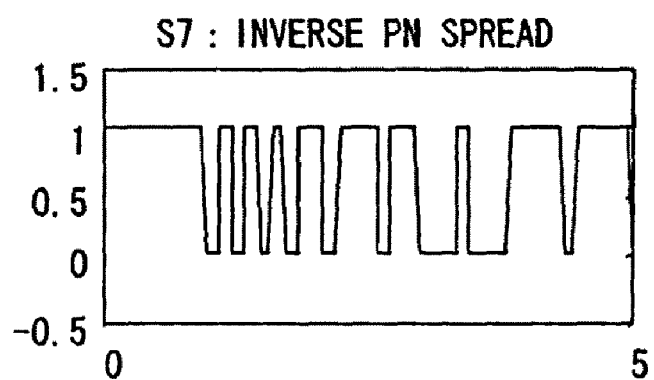
FIG. 9C is a view showing a signal waveform in a communication device according to a first embodiment of this invention and shows a signal waveform of inverse PN spread code.

The first inverse spread unit 42 of the receiver 31 performs inverse spread processing on this superimposed signal S6 by the common PN code and generates an inverse PN spread signal S7 shown in FIG. 9C. This inverse PN spread signal S7 is input to the inverse spread units of each channel 43a to 43c. For example, the spread unit of each channel 43a decodes a signal of channel ch1.

Figure 7E:
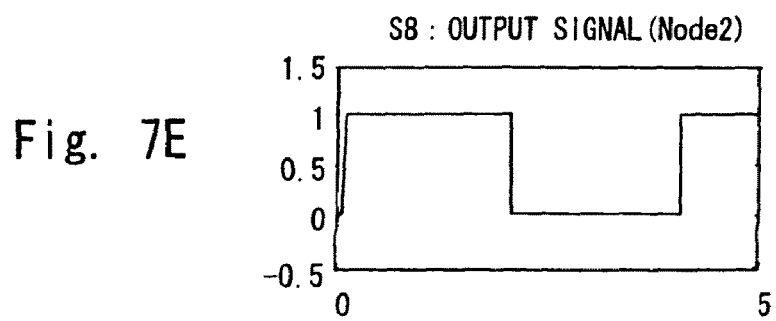
Figure 8E:
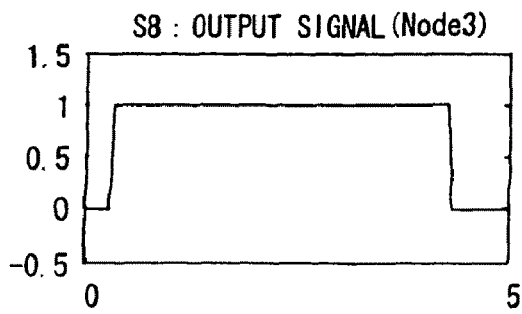

Therefore, the matrix generator 431a generates a matrix (ch1) shown in FIG. 6B and the second inverse spread unit 432 generates an output signal (Node 1) (S8) corresponding to FIG. 6A by performing inverse spread processing against the inverse PN spread signal S7 by that matrix (ch1) as shown in FIG. 6E. Each inverse spread unit 43b and 43c can decode a predetermined signal by performing inverse spread processing by corresponding matrix (chn) in same way as shown in FIGS. 7E and 8E.

Figure 10A:
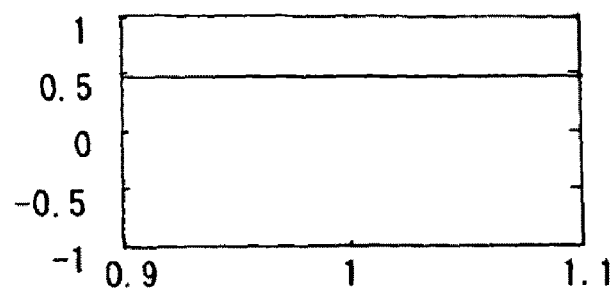
FIG. 10A is a view showing a waveform of a reference signal.

Both of the synchronization detectors 24 and 44 capture synchronization by generating the reference signal from the synchronization signal. The reference signal shown in FIG. 10A is made to the synchronization signal by being spread by the PN code at the master transmitter 20x and superimposed with the common PN code at the synchronization detector 24 of the slave transmitter 20a that receives the synchronization signal. At this time the common PN code generator 245 generates a common PN code at a suitable timing.

Figure 10B:
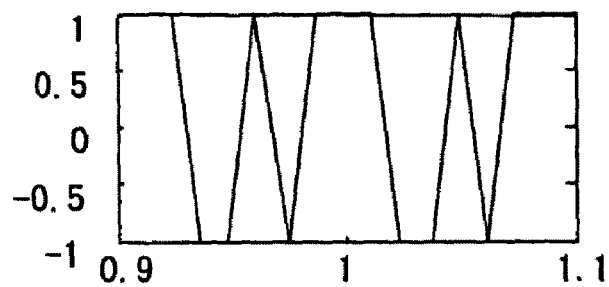
FIG. 10B is a view showing a waveform of low level signal and noise which are gained by a self correlation function of PN series.
Figure 10C:
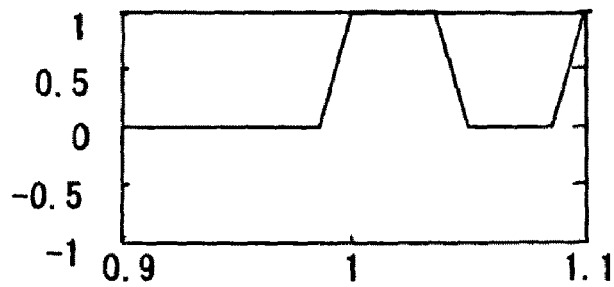
FIG. 10C is a view showing a waveform of narrow band signal (primary modulation signal) equal to or above a predetermined level.
Figure 10D:
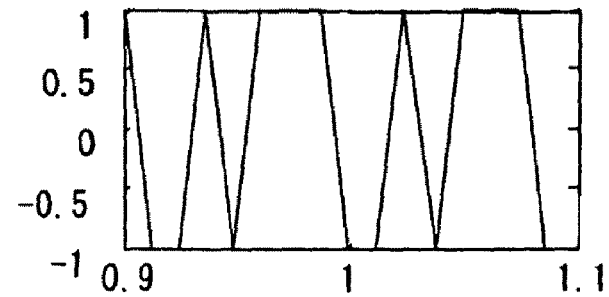
FIG. 10D is a view showing a waveform of low level signal and noise which is gained by a self correlation function of PN series as well as in FIG. 10B.
Figure 11A:
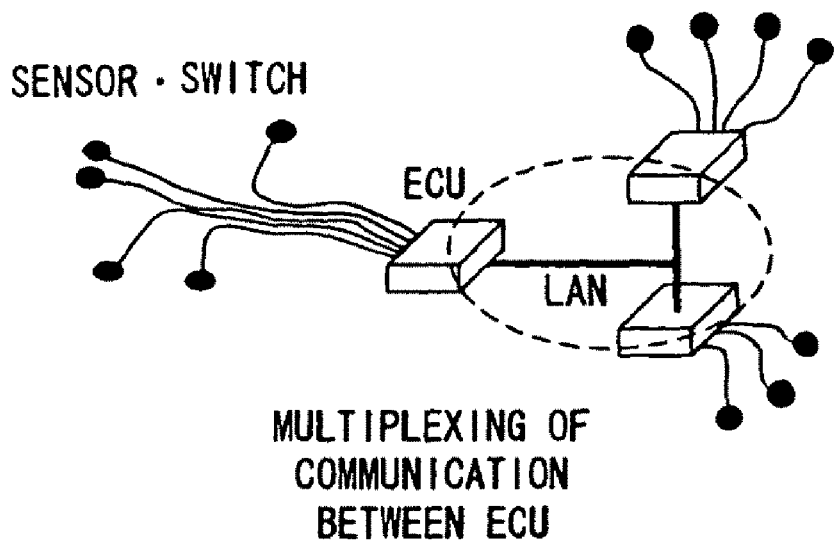
FIG. 11A is a view for explaining a related communication method of a communication device for car.
Figure 11B:
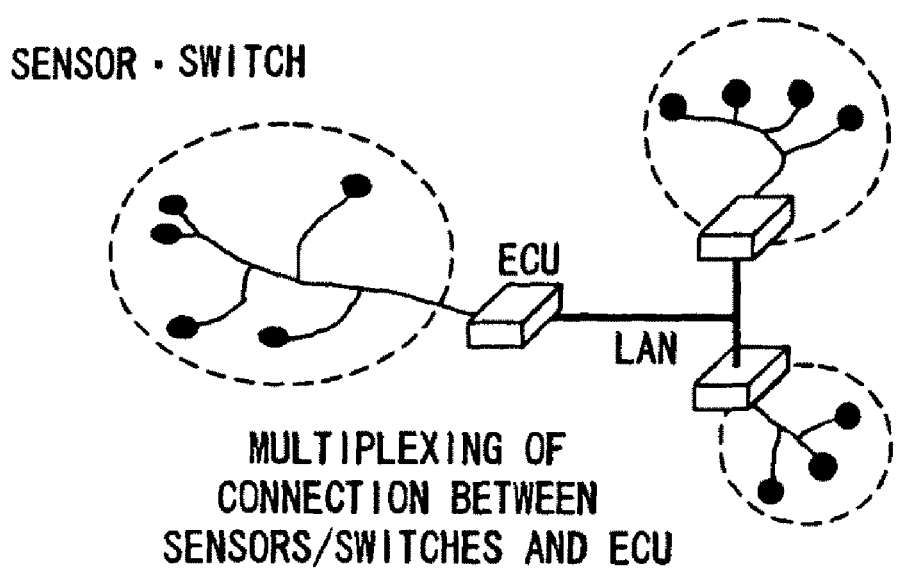
FIG. 11B is a view for explaining a communication method of a communication device for car which is demanded to be realized.
Figure 12:
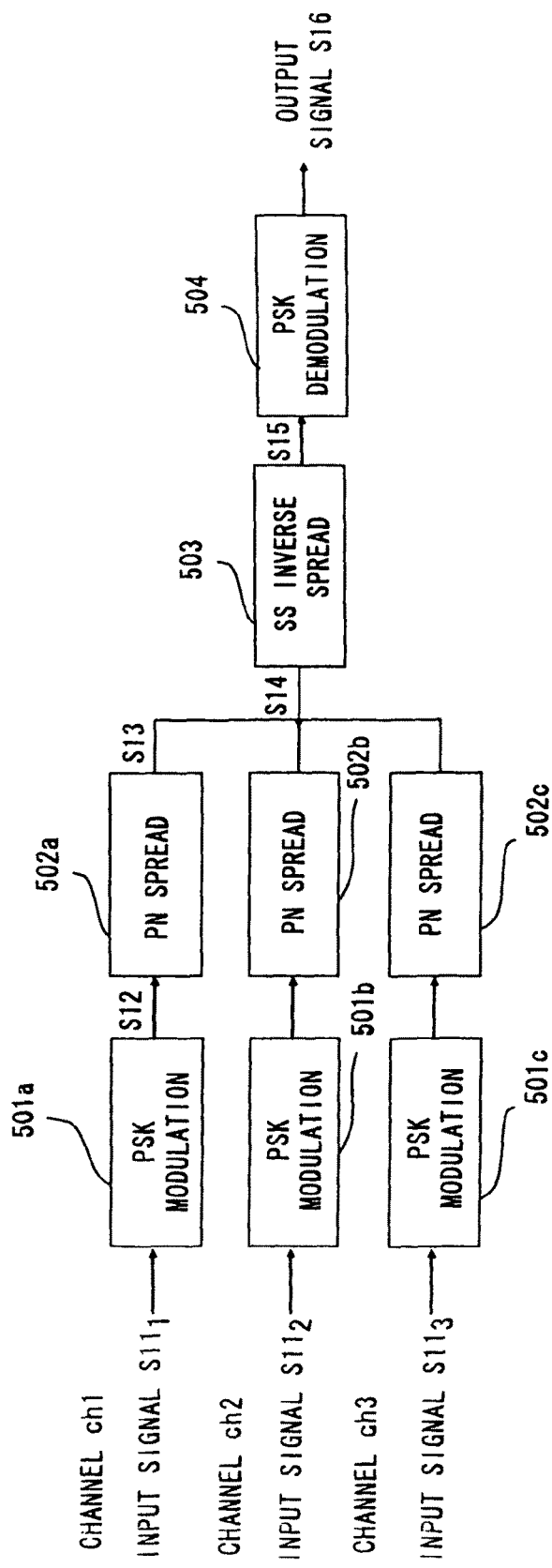
FIG. 12 is a view showing a related communication device that superimposes the plurality of input signals and transmits a superimposed signal.
Figure 13A:
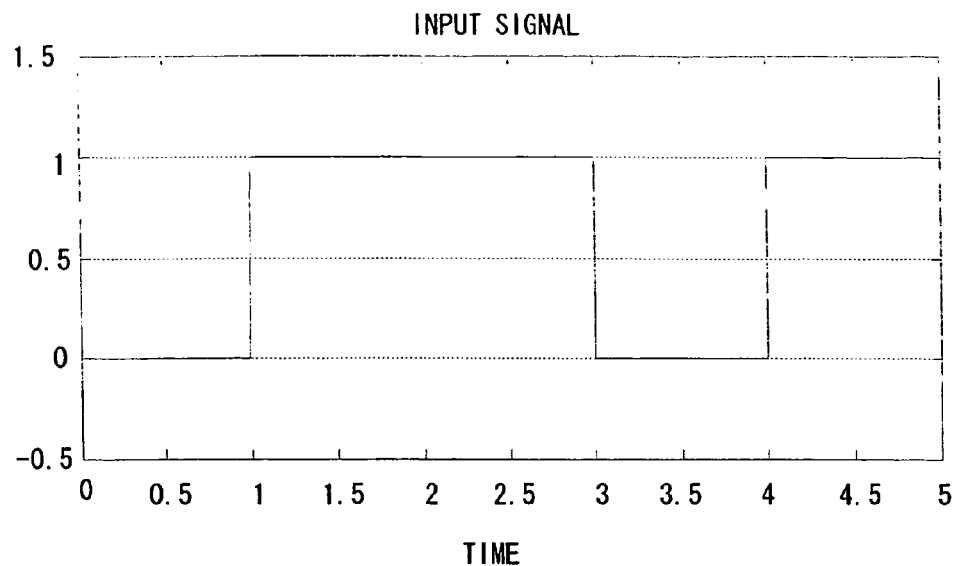
FIGS. 13A to 13F are views showing signal waveforms.
Figure 13B:
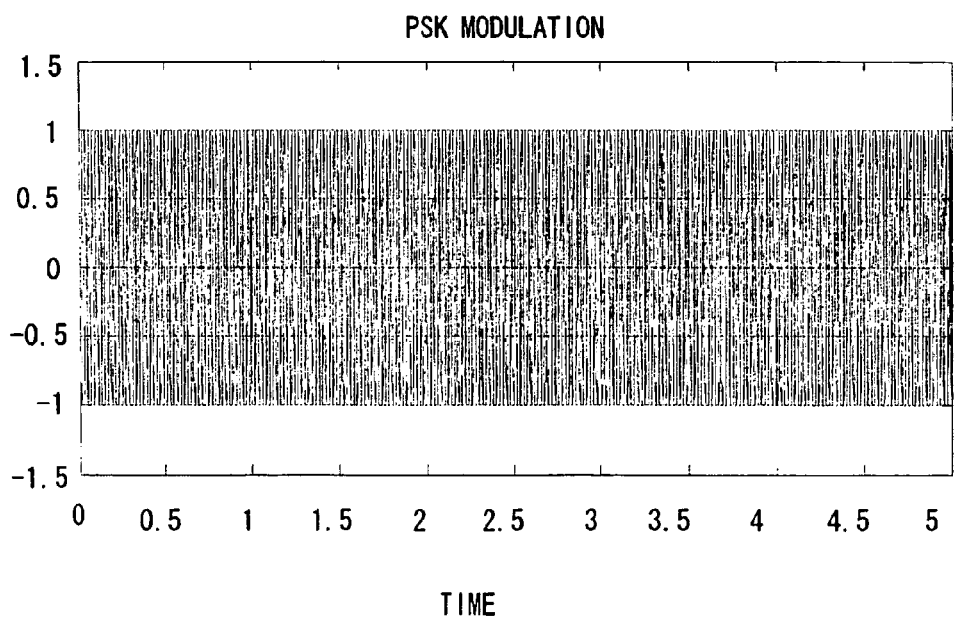
Figure 13C:
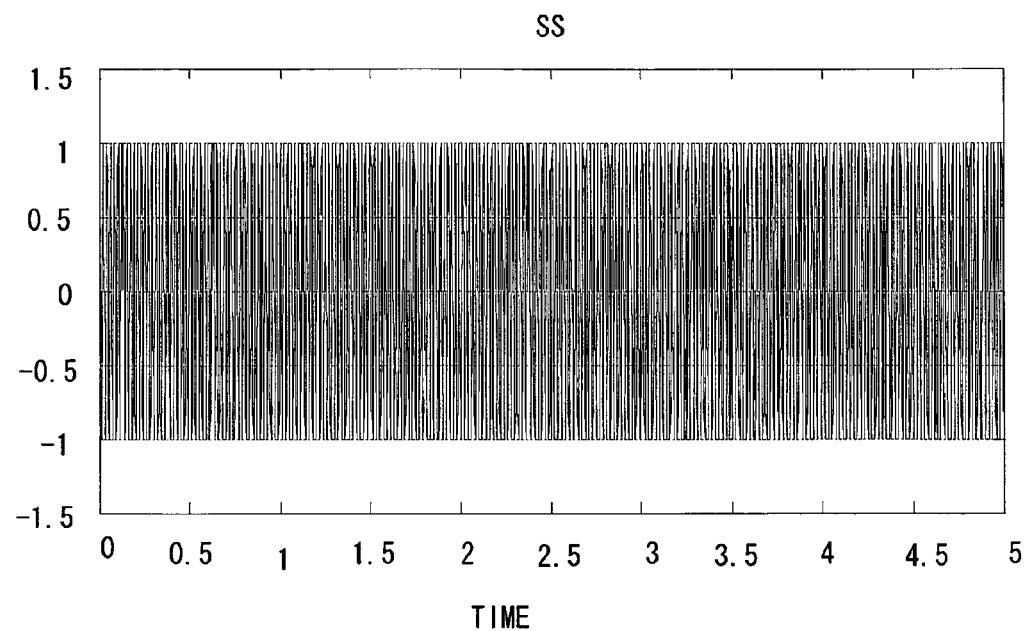
Figure 13D:
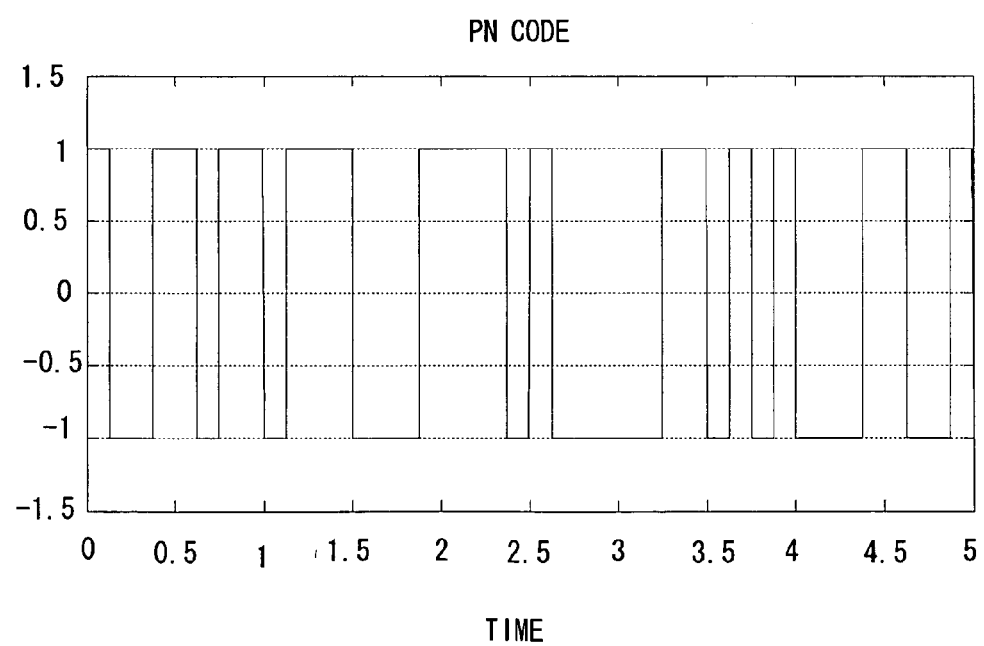
Figure 13E:
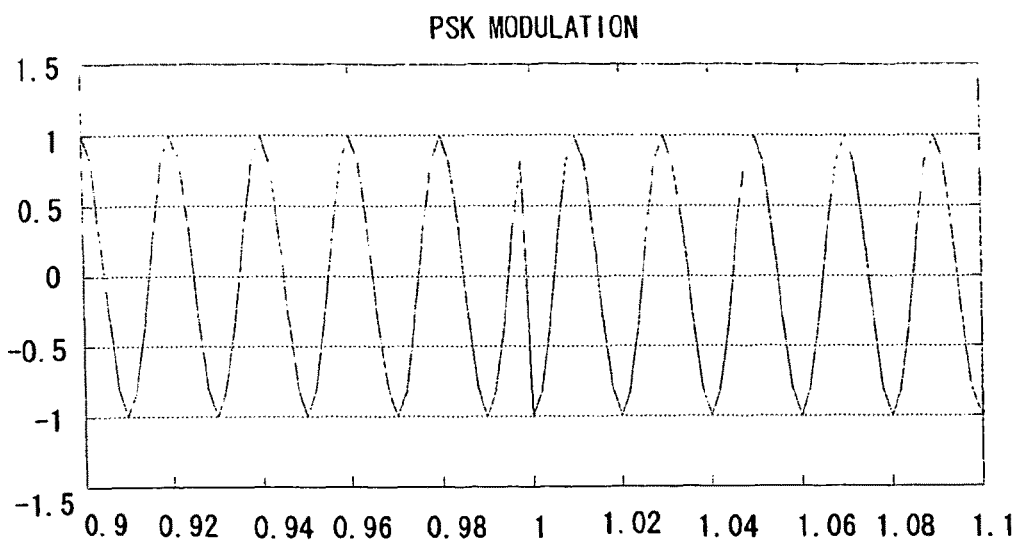
Figure 13F:
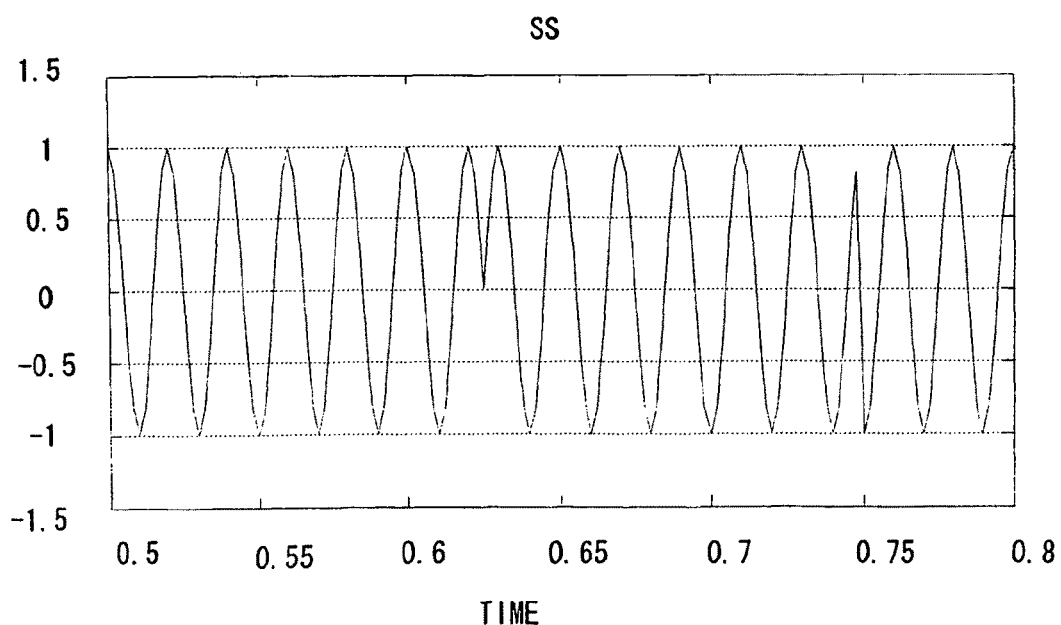
Figure 14A:
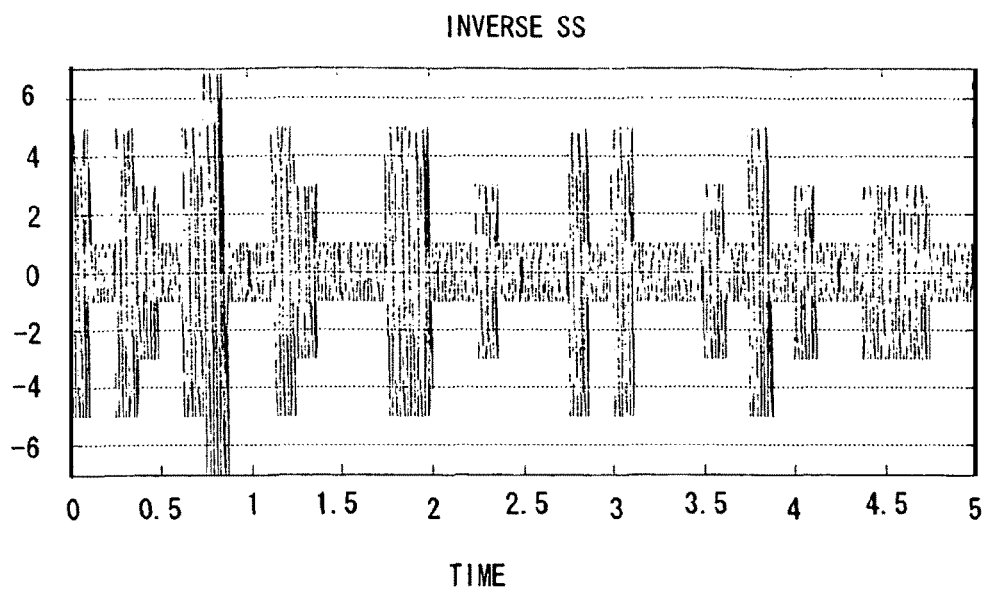
FIGS. 14A to 14E are views showing signal waveforms.
Figure 14B:
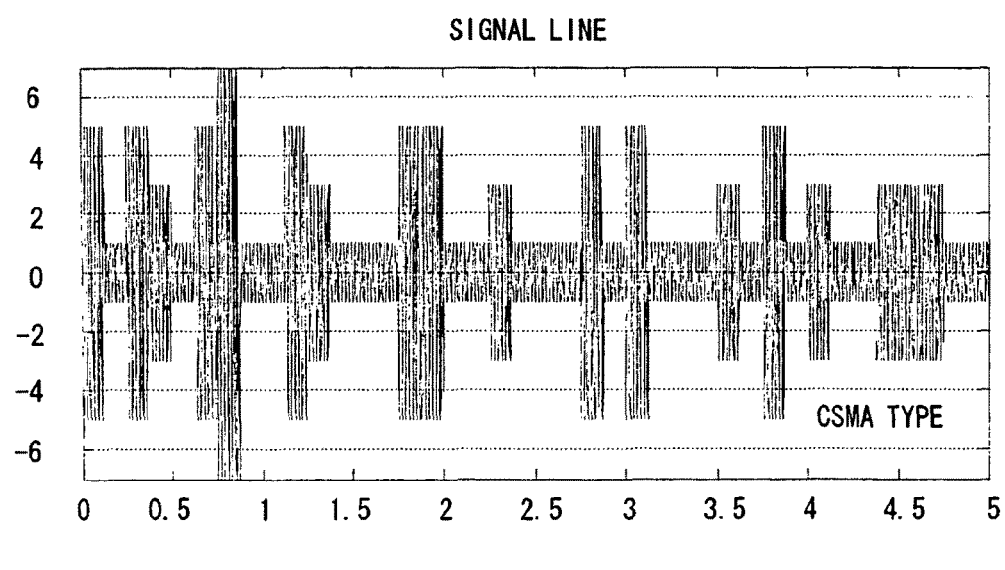
Figure 14C:
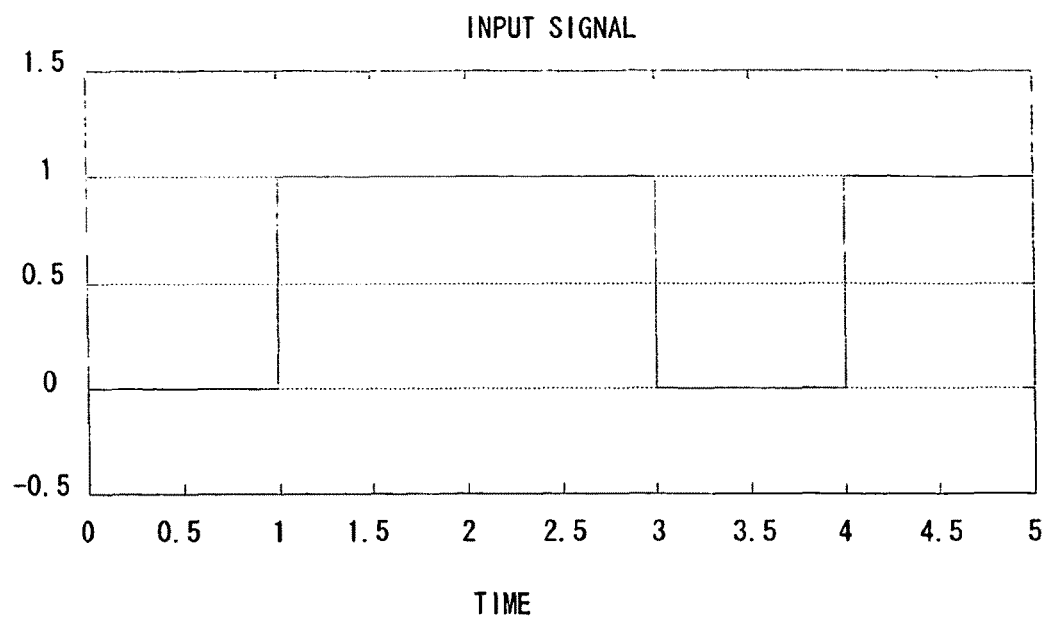
Figure 14D:
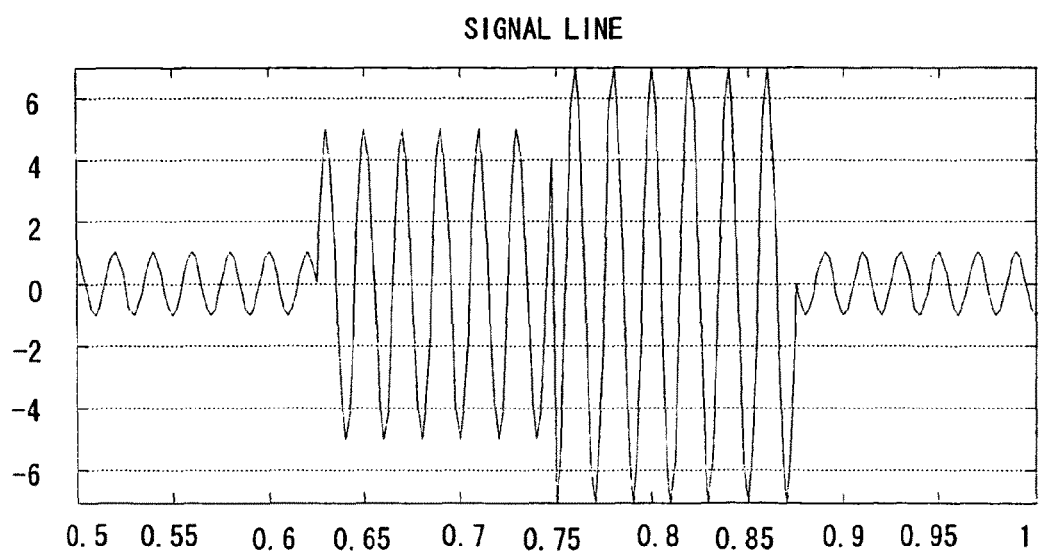
Figure 14E:
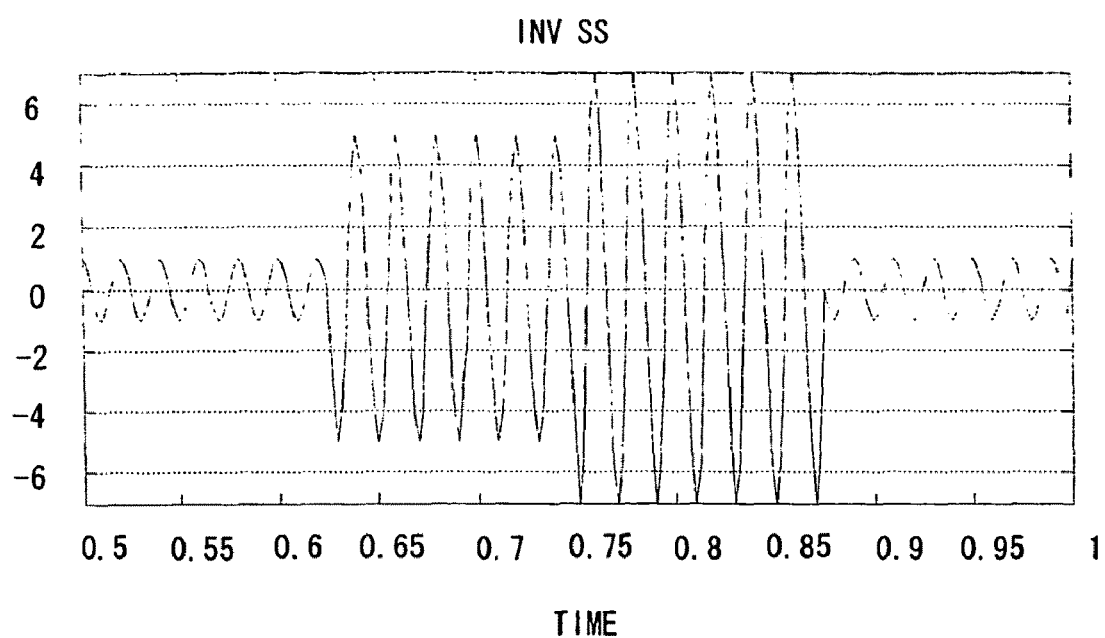

When a phase of the generated common PN code matches a phase of the common PN code of the synchronization signal, a narrow band signal (first-order modulation signal) above a predetermined constant level is emerged on an output from the BPF (band pass filter) as shown in FIG. 10C. On the other hand, when the phases of the common PN codes do not match, a signal and noise of a low level determined by a self correlation function of PN series are gained as shown in FIGS. 10B and 10D.

In this embodiment, double spread processing is performed to thereby making it possible for the synchronization determination units 241 and 441 to determine whether a phase of the common PN code of the synchronization signal matches a phase of the common PN code generated at the common PN code generators 245 and 445 by performing a threshold value decision of the BPF output of the signal that undergoes the inverse spread processing by the matrix in accordance with the channel 0 for the common PN code and the synchronization signal. When the phases do not match, the synchronization determination units 241 and 441 make a decision again after shifting generation timing by plus 1 or minus 1. By repeating this step, a correct synchronization position is obtained.

In this embodiment, signals from the plurality of signal sources are allocated to different channels. Then the signal is transmitted after spread process is performed by the spread code, which has a different value for each channel and is scheduled according to a transmission cycle of its signal.

This makes it possible to consolidate a harness of the plurality of sensors and switches which are connected to the ECU, decrease a number of wiring lines, lighten a weight of wiring lines, decrease a number of harness remarkably that is used to be connected to switches or sensors one by one, and lighten a weight of a car. This also makes it possible to lower a man-hour for setting the wire harness and for developing it, a development cost, and a step of manufacturing.

When synchronization type of spread spectrum communication is used for gaining a large number of connections, the communication from the sensors or switches to the ECU is configured as a many-to-one communication. In this case, a length of communication path is required to be within one cycle basically thereby determining the maximum communication speed. That is, an effective communication speed is calculated by dividing by a spread rate (a number of nodes in case of synchronization type), and the communication speed would be 1/100 in case that 100 ch were connected for example.

In this embodiment, required transmission cycles of each node are separated, and signals of longer cycle capable of being sampled are extracted by using the scheduled spread code that is made by combining the long or short of cycles. Therefore, a substantial spread rate is lowered, and the effective communication speed is increased.

As explained above, a car has a lot of switches or sensors and sometimes a number of switches or sensors is above hundred. Therefore, it requires a lot of wiring to connect between each node (signal source) and ECU. The wire harness is enlarged. In order to miniaturize the wire harness, uniting a communication between each node and the ECU is one way to take but each node cannot control the communication because each node is cheap and low-functional. Therefore, controlling of communication has to be performed at the connector side not at the wire harness side.

In this embodiment, a communication with a constant amplitude at signal line is realized without monitoring and controlling transmission signals between devices. This is realized by using scheduled spread code where a signal peak is not superimposed mutually between each node.

By separating transmission cycles of each node in the scheduled spread code and combining long or short length of cycles, it is realized that slower sampling signals are extracted and increase a number of connection node within a limited carrier frequency.

It is apparent that the present invention is not limited to the above embodiments, but may be modified and changed without departing from the scope and spirit of the invention.

What is claimed is:

1. A transmitter performing spread spectrum communication using a spread code, the transmitter comprising:
   a transmission-side individual code generator generating an individual spread code comprised of a spread code scheduled according to a difference of a transmission cycle of an input signal; and
   a first spread unit performing spread spectrum processing on the input signal by the individual spread code,
   wherein the individual spread code has N+1 (N is a natural number excluding zero) types of code rows scheduled to N+1 pieces capable of superimposing N pieces of the input signal and a reference signal for synchronization detection on a common communication path to transmit the superimposed signals.

2. The transmitter according to claim 1, further comprising:
   a first transmission processing unit including the transmission-side individual code generator where a first input signal having a first transmission cycle is input and the individual spread code corresponding to a transmission cycle of the first input signal is generated, the first transmission processing unit performing spread spectrum processing on the first input signal by using the individual spread code generated at the transmission-side individual code generator; and
   a second transmission processing unit including the transmission-side individual code generator where a second input signal having a second transmission cycle slower than the first transmission cycle is input and the individual spread code corresponding to a transmission cycle of the second input signal is generated, the second transmission processing unit performing spread spectrum processing on the second input signal by using the individual spread code generated at the transmission-side individual code generator.

3. The transmitter according to claim 2, wherein the individual spread code is superimposed on the second input signal between first input signals.

4. The transmitter according to claim 2, wherein a signal gained by spreading the first input signal with the individual spread code and a signal gained by spreading the second input signal with the individual spread code have a different peak time with each other.

5. The transmitter according to claim 2, wherein the first transmission cycle is different from the second transmission cycle.

6. The transmitter according to claim 1, further comprising: a synchronization detector detecting synchronization.

7. The transmitter according to claim 6, wherein the synchronization detector detects synchronization by a reference signal which is obtained by performing inverse spread spectrum processing on a signal from the communication path using the individual spread code scheduled for synchronization capturing.

8. The transmitter according to claim 6, wherein the synchronization detector includes:
   a common code generator generating a spread code common to all the input signals; and
   a second spread unit performing spread spectrum processing on a signal by the common spread code, the signal being gained through spread spectrum processing at the first spread unit.

9. The transmitter according to claim 1, wherein the individual spread code comprises matrices of a spread code scheduled by combining a long or short length of a transmission cycle of the input signal that is to be a transmission data, the long length being greater than the short length.

10. The transmitter according to claim 1, further comprising a first transmission processing unit including the transmission-side individual code generator where a first input signal having a first transmission cycle is input and the individual spread code corresponding to a transmission cycle of the first input signal is generated, the first transmission processing unit performing spread spectrum processing on the first input signal by using the individual spread code generated at the transmission-side individual code generator.

* * * * *